US008155301B2

(12) United States Patent
Wang

(10) Patent No.: US 8,155,301 B2
(45) Date of Patent: Apr. 10, 2012

(54) SYSTEM AND METHOD FOR DIALING PROMPT

(75) Inventor: Feng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 415 days.

(21) Appl. No.: 12/433,122

(22) Filed: Apr. 30, 2009

(65) Prior Publication Data

US 2009/0214022 A1 Aug. 27, 2009

Related U.S. Application Data

(63) Continuation of application No. PCT/CN2007/070971, filed on Oct. 26, 2007.

(30) Foreign Application Priority Data

Oct. 30, 2006 (CN) .......................... 2006 1 0150198

(51) Int. Cl.
*H04M 1/00* (2006.01)
*H04M 3/00* (2006.01)

(52) U.S. Cl. .................................. 379/373.03; 379/372

(58) Field of Classification Search .................. 379/372, 379/373.03

See application file for complete search history.

(56) References Cited

U.S. PATENT DOCUMENTS

| | | | |
|---|---|---|---|
| 5,912,947 A | 6/1999 | Langsenkamp et al. | |
| 6,608,891 B1 | 8/2003 | Pelletier et al. | |
| 2003/0231749 A1* | 12/2003 | Ansley et al. | 379/93.17 |
| 2004/0114732 A1 | 6/2004 | Choe et al. | |

FOREIGN PATENT DOCUMENTS

| | | |
|---|---|---|
| CN | 1248124 A | 3/2000 |
| CN | 1266324 A | 9/2000 |
| CN | 1400767 | 3/2003 |
| CN | 1671159 A | 9/2005 |
| CN | 1731797 A | 2/2006 |
| CN | 100589507 | 2/2010 |
| JP | 2002-223297 | 8/2002 |

OTHER PUBLICATIONS

European Patent Office Communication pursuant to Rule 94(3) EPC, for European application No. 07 817 162.6 2414, dated Sep. 29, 2010, 4 pgs.

Chinese Office Action dated Dec. 26, 2008, in related Chinese Application No. 2006101501987, with English translation.

(Continued)

*Primary Examiner* — Alexander Jamal

(74) *Attorney, Agent, or Firm* — Finnegan, Henderson, Farabow, Garrett & Dunner LLP

(57) ABSTRACT

A dialing prompt system and method may include a monitoring unit, and a dialing prompt information processing unit. The monitoring unit is adapted to monitor whether it is necessary to send dialing prompt information to a user, and if necessary, trigger the dialing prompt information processing unit. The dialing prompt information processing unit determines dialing prompt information for the user, and sends the information to the user. After the embodiment of the present invention is applied to a communication system, if the user sends a call request (by going off-hook, for example), the dialing prompt system generates voice information, text information, picture information, or video image information (namely, at least one of such items) as an indication that allows the user to make the call. That is, at least one item of "voice information, text information, picture information, and video image information" may form diversified information to replace the existing unitary dialing prompt audio signal.

12 Claims, 4 Drawing Sheets

OTHER PUBLICATIONS

English Translation of Written Opinion of the International Searching Authority for PCT Application No. PCT/CN2007/07971, mailed Feb. 14, 2008, 4 pgs.

European Patent Office Communication, which encloses an extended European search report which includes, pursuant to Rule 62 EPC, the supplementary European search report (Art. 153(7)) EPC) and the European search opinion, dated Dec. 22, 2009, 5 pgs.

International Search Report from P.R. China in International Application No. PCT/CN2007/070971 mailed Feb. 14, 2008.

* cited by examiner

SYSTEM AND METHOD FOR DIALING PROMPT

CROSS-REFERENCE TO RELATED APPLICATION

This application is a continuation of International Application No. PCT/CN2007/070971, filed on Oct. 26, 2007, titled "System and Method for Dialing Prompt", which claims the priority of Chinese Patent Application No. 200610150198.7, filed on Oct. 30, 2006, titled "System and Method for Dialing Prompt", the entire contents of all of which are incorporated herein by reference.

TECHNICAL FIELD

The present invention relates to the field of network communication technologies, and in particular, to a system and method for generating a dialing prompt.

BACKGROUND

Currently in a communication system, for a call originated by the calling party, the user receives a dialing prompt tone from the communication system after sending a call request. For example, this may occur by going off-hook, namely, in the time segment from the user going off-hook to the user dialing. That is, the communication system plays a dialing prompt tone to the user, prompting the user to dial a number.

Generally, the dialing prompt tone that can be generated by the existing communication system is a unitary audio signal, for example, a 450±25 Hz continuous audio signal, which can convey no more information than simple call permission. Even if a special dialing prompt tone can be generated, it is a monotonous audio prompt tone, for example, a 450±25 Hz periodical audio signal which alternates 400 ms connection with 40 ms disconnection, and the user is unable to customize the prompt. Therefore, the dialing prompt tone is very monotonous.

SUMMARY

Embodiments disclosed herein are directed to providing a system and method for generating a dialing prompt. Through the system and method, the dialing prompt system provides the user with set or customized dialing prompt tone information in the time segment from the user going off-hook to dialing and within the intervals of dialing, thus enriching the functions of the communication system and better serving the user.

In some embodiments, a dialing prompt system may include:

a monitoring unit, adapted to monitor whether it is necessary to send dialing prompt information to a user, and send a triggering signal if necessary; and a dialing prompt information processing unit, adapted to determine dialing prompt information for the user after receiving the triggering signal of the monitoring unit, where the dialing prompt information includes at least one of these items: voice information, text information, picture information, and video image information.

In some embodiments, a dialing prompt method may include:

monitoring whether it is necessary to send dialing prompt information to a user: if necessary, determining dialing prompt information for the user, where the dialing prompt information includes at least one of these items: voice information, text information, picture information, and video image information.

The technical solution provided consistent with the disclosed embodiments may reveal that by applying the disclosed embodiments to a communication system, diversified dialing prompt information may be generated in the communication system, and selectively sent to the user, thus replacing the unitary dialing prompt audio signal in the prior art. Therefore, diversified dialing prompt information instead of monotonous audio signals is available to users.

DETAILED DESCRIPTION

The system and method for dialing prompt disclosed herein generate voice, text, and/or image information as dialing prompt information, namely, the dialing prompt information may include at least one of these items: voice information, text information, picture information, and video image information, in the time segment of waiting for dialing after the user originates a call, for example, by going off-hook. The dialing prompt information replaces the existing unitary audio dialing prompt, and the voice, text and/or image information may be customized flexibly.

That is, in some embodiments, when the call originator sends a call request to the communication system through a call terminal, the call originator may hear and/or see diversified voice, text and/or image information output through the call terminal instead of a monotonous dialing tone. The call terminals that originate a call request may include, but are not limited to: fixed terminal, for example, analog or digital telephone set, mobile terminal, for example, Personal Communication System (PCS), Time Division Multiple Access (TDMA), Advanced Mobile Phone System (AMPS), Personal Handheld System (PHS), Global System for Mobile communication (GSM), Code Division Multiple Access (CDMA), Wireless CDMA (WCDMA), International Mobile Telecommunication system 2000 (IMT-2000), IP Multimedia System (IMS), and satellite phones of various standards, multimedia terminal, and various terminals based on the IP access mode.

In some embodiments , a dialing prompt system is adapted to send the prompt information of the communication system to the user in the communication system. Moreover, the system may be a physical entity or logical entity, and the corresponding system does not necessarily exist independently, namely, the system may exist independently or may be set into another entity to form an integrated entity or may be multiple interrelated entities composed of different entities, as detailed hereinafter.

Embodiment 1

Figure 1:
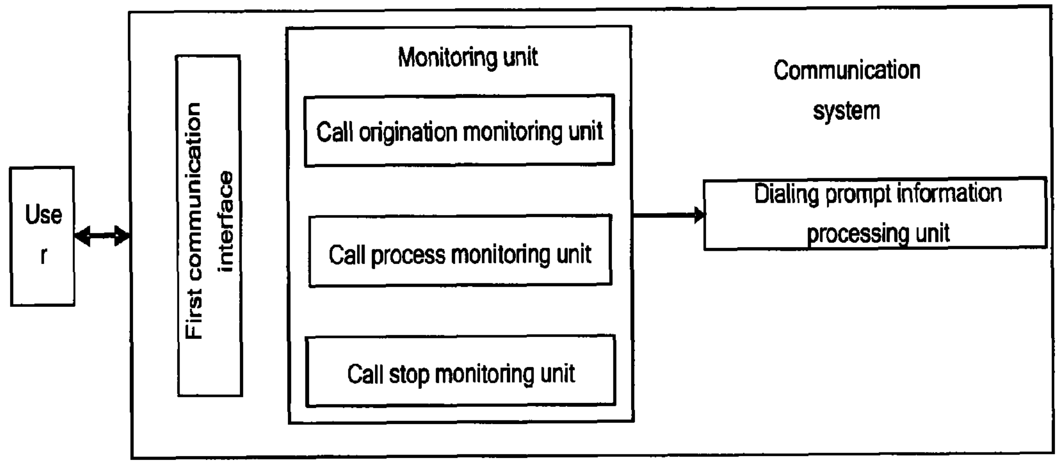
FIG. 1 shows an exemplary structure of a dialing prompt system in the first embodiment of the present disclosure.

As shown in FIG. 1, the dialing prompt system may include a monitoring unit and a dialing prompt information processing unit.

The monitoring unit is adapted to monitor whether it is necessary to send dialing prompt information to the user, and if necessary, trigger the dialing prompt information processing unit. More particularly, the monitoring unit may monitor the call actions, call processes and trunk signaling initiated by the call originator, and judge whether it is necessary to send dialing prompt information according to the state of the call process in order to trigger the dialing prompt information processing unit.

The monitoring unit may be classified into the following parts according to the stage of a call. In some embodiments, a call origination monitoring unit is adapted to monitor whether the user originates a call, and when the user originates a call, trigger a dialing prompt information processing unit. More particularly, after the user goes off-hook, which may indicate that the user wants to make a call, the call origination monitoring unit monitors if it is necessary to send dialing prompt information to the user, indicating that the system is normally available for handling the call, sends the monitoring result to the dialing prompt information processing unit, and triggers the dialing prompt information processing unit. In some embodiments, a call process monitoring unit is adapted to monitor whether the call information in the call process matches the preset conditions, and if the result of matching meets the preset requirements, trigger the dialing prompt information processing unit. More particularly, the call process monitoring unit may monitor the call state of the user continuously in the dialing process after the user goes off-hook to dial up, obtain a monitoring result, and send the monitoring result to the dialing prompt information processing unit in order to trigger the dialing prompt information processing unit. In some embodiments, a call stop monitoring unit is adapted to monitor whether the call process of the user stops beyond the set time, and if the call process stops beyond the set time, trigger the dialing prompt information processing unit. More particularly, the call stop monitoring unit may obtain a monitoring result when detecting that the user dials no digit in a long time and abandons the call, send the monitoring result to the dialing prompt information processing unit, and trigger the dialing prompt information processing unit. In some embodiments, a dialing prompt information processing unit is adapted to determine the corresponding dialing prompt information for the user according to the preset policy, and send the information to the user. The dialing prompt information processing unit may determine the dialing prompt information to be sent to the user according to the monitoring result of the monitoring unit, user attribute information, and the corresponding preset policy, send the dialing prompt information to the user; or determines the dialing prompt information to be sent to the user according to the monitoring result of the monitoring unit, the user call information, user attribute information and the corresponding preset policy, and send the dialing prompt information to the user.

Depending on the call process, the monitoring comes in the following circumstances:

The monitoring unit detects that the user originates a call, determines the dialing prompt information to be sent to the user according to the user attribute information and the preset policy, and sends the dialing prompt information to the user.

The monitoring unit monitors the call process of the user, matches the user call information with the preset conditions, determines the dialing prompt information to be sent to the user according to the user attribute information and the preset policy, and sends the dialing prompt information to the user.

The monitoring unit detects that the call process of the user stops beyond the set time, determines the dialing prompt information to be sent to the user according to the user attribute information and the preset policy, and sends the dialing prompt information to the user.

The dialing prompt information that is to be sent to the user and determined according to the preset policy may be a combination of multiple information formats, or a single information format. Different information may be generated according to different settings in each call.

The first communication interface is provided in this embodiment of the invention. The first communication interface may be connected with the communication system, and adapted to transmit the information of interaction between the communication system and the dialing prompt system. Through the first communication interface, the monitoring unit may monitor whether it is necessary to send dialing prompt information to the user. The first communication interface may be a user-network interface, or a network-network interface (trunk interface). This interface may support user signaling and trunk signaling of various standards, and support various bearer modes, including but not limited, to circuit-switched bearer mode and packet-switched bearer mode.

The dialing prompt information processing unit in the first embodiment may be set inside the communication system.

Embodiment 2

Figure 2:
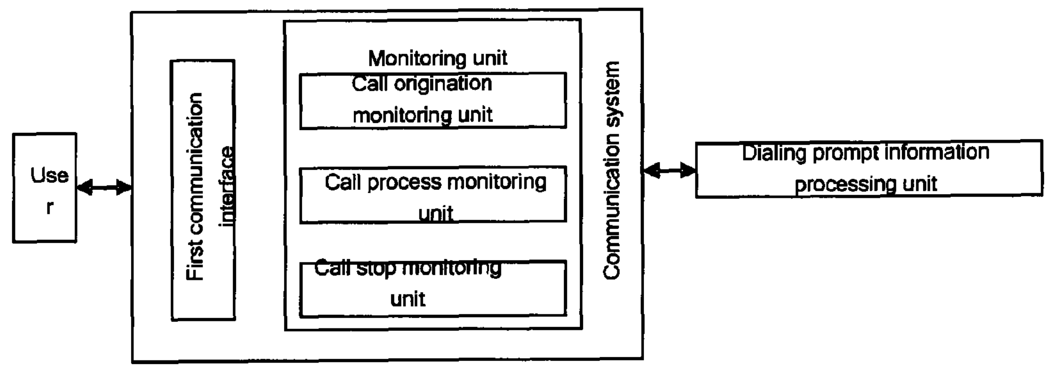
FIG. 2 shows an exemplary structure of a dialing prompt system in the second embodiment of the present disclosure.

As shown in FIG. 2, compared with the first embodiment, the difference of the second embodiment is that the dialing prompt information processing unit may also be set outside the communication system, for example, set at the user side.

The preset policy applied in the first embodiment and the second embodiment and the dialing prompt information sent to the user are a fixed mode of the communication system, and it is not allowed to set the preset policy or the dialing prompt information sent to the user.

Embodiment 3

Figure 3:
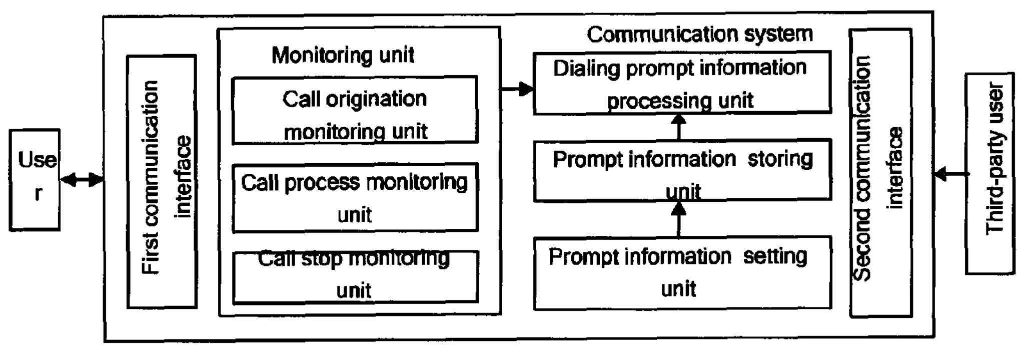
FIG. 3 shows an exemplary structure of a dialing prompt system in the third embodiment of the present disclosure.

As shown in FIG. 3, on the basis of the first embodiment and the second embodiment, the dialing prompt system in the third embodiment further includes a prompt information storing unit and/or a prompt information setting unit. The prompt information storing unit is adapted to store the dialing prompt information set by the communication system and/or user and/or a third party (namely, one or more items of: communication system, user, and third party). When it is necessary to send dialing prompt information to the user, the dialing prompt information processing unit reads and determines the corresponding dialing prompt information from the prompt information storing unit according to the preset policy, and sends the dialing prompt information to the user; the prompt information setting unit is adapted to set the data information provided by the communication system and/or user and/or the third party to the dialing prompt information as requested by the communication system and/or user and/or the third party. In FIG. 3, the corresponding units namely, a prompt information storing unit and/or a prompt information setting unit, are added on the basis of the first embodiment. The technical solution where the corresponding units are added on the basis of the second embodiment is rather similar, and is not detailed herein.

The preset policy applied in the third embodiment is a fixed mode of the communication system, and cannot be set. The dialing prompt information may be an inherent mode of the communication system or set as requested by the communication system and/or user and/or the third party.

Embodiment 4

Figure 4:
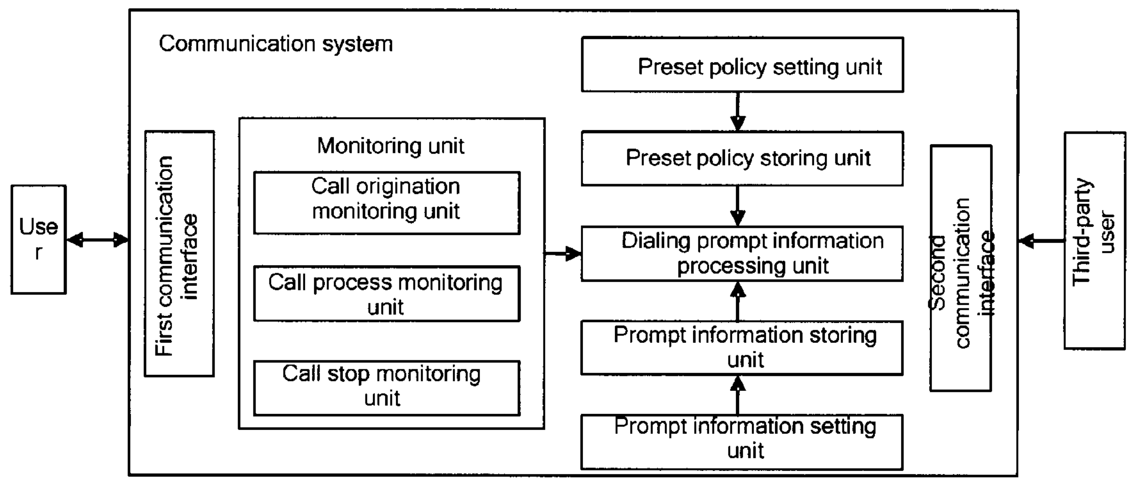
FIG. 4 shows an exemplary structure of a dialing prompt system in the fourth embodiment of the present disclosure.

As shown in FIG. 4, on the basis of the first, second or third embodiment, the dialing prompt system in the fourth embodiment further includes a preset policy storing unit and/or a preset policy setting unit (namely, one or both of: preset policy storing unit, and preset policy setting unit). The preset policy storing unit is adapted to store the preset policy which corresponds to the dialing prompt information and is determined according to the user attributes and the mode of the communication system. The preset policy setting unit is adapted to set the preset policy which is corresponding to the dialing prompt information of the user in light of the user attributes and requested by the communication system and/or user and/or the third party, namely, one or more items of: communication system, user, and third party. In FIG. 4, the corresponding units are added on the basis of the third embodiment. The technical solution where the corresponding units are added on the basis of the first or second embodiment is rather similar, and is not detailed herein.

If the fourth embodiment is based on the first or second embodiment, the dialing prompt information applied in the fourth embodiment is a fixed mode of the communication system, and cannot be set. The preset policy may be a fixed mode of the communication system or set as requested by the communication system and/or the user and/or the third party.

If the fourth embodiment is based on the third embodiment, the preset policy and the dialing prompt information in the fourth embodiment may be a fixed mode of the communication system, or set as requested by the communication system and/or the user and/or the third party, which is illustrated in FIG. 4.

To facilitate setting of the preset policy and the dialing prompt information, the third embodiment and the fourth embodiment provide a second communication interface, which is adapted to connect the communication system and/or the user and/or the third-party user. Through the second communication interface, the communication system and/or the user and/or the third-party user sets the prompt information and/or the preset policy. The second communication interface is a communication interface between "the communication system and/or the user and/or the third-party user, namely, one or more items of: communication system, user, and third party; that is, the external system" and the dialing prompt system consistent with the embodiments disclosed herein. Through this interface, the communication system and/or the user and/or the third-party user may operate the user data in the system consistent with the embodiments disclosed herein. The second communication interface also provides an open application development and programming interface, through which value-added services may be developed. Specifically, this interface provides the communication function, application-layer protocol conversion function, bearer protocol adaptation function, operation and maintenance function, and network management function.

The dialing prompt information mentioned above may include voice information, text information, and/or image information, or combination thereof.

In some embodiments, a dialing prompt method may include the following steps.

In a user call process, a dialing prompt system monitors whether it is necessary to send dialing prompt information to the user, and if necessary, the dialing prompt system generates a monitoring result, determines the dialing prompt information to be sent to the user according to the user attribute information and the corresponding preset policy, and sends the information to the user; or the dialing prompt system determines the dialing prompt information to be sent to the user according to the user call information, user attribute information, and the corresponding preset policy, and sends the information to the user. Depending on the call process, the monitoring process may occur based on the following circumstances:

A monitoring unit monitors whether the user originates a call. When the user originates a call, the monitoring unit generates a monitoring result about the call originated by the user, and triggers the dialing prompt information processing unit. According to the monitoring result and the user attribute information, the dialing prompt information processing unit selects the proper preset policy, determines the dialing prompt information to be sent to the user according to the preset policy, and sends the information to the user.

A monitoring unit monitors whether the call information matches the preset conditions in the call process of the user. If the preset conditions are matched, the monitoring unit generates a monitoring result about matching, and triggers the dialing prompt information processing unit. According to the monitoring result, the dialing prompt information processing unit matches the user call information with the preset conditions, selects the proper preset policy according to the user attribute information, determines the dialing prompt information to be sent to the user according to the preset policy, and sends the information to the user.

A monitoring unit monitors whether the call process stops beyond the set time. If the call process stops beyond the set time, the monitoring unit generates a monitoring result about the call stop of the user, and triggers the dialing prompt information processing unit. According to the monitoring result and the user attribute information, the dialing prompt information processing unit selects the proper preset policy, determines the dialing prompt information to be sent to the user according to the preset policy, and sends the information to the user.

For the dialing prompt information mentioned above, a dialing prompt information library may be set in the fixed mode in the communication system; or the data information requested by the communication system, and/or the user and/or the third party may be set and saved as dialing prompt information as requested by the communication system, and/or the user and/or the third party.

For the preset policy mentioned above, a preset policy library may be set in the fixed mode in the communication system, or the preset policy corresponding to the dialing prompt information of the user may be set and saved according to the user attributes as requested by the communication system, and/or the user and/or the third party.

In some embodiments, the implementation process may, include the following steps.

After the user namely, a call originator, sends a call request, the dialing prompt system generates voice, text and/or image information, and sends the information to a User Equipment (UE) as dialing prompt information to be sent to the user. The information may include at least one of, voice information, text information, and image information; or combination thereof.

For example, after the user goes off-hook, the dialing prompt system sends voice, text and/or image information to the off-hook UE as dialing prompt information, or in the dialing process of the user, the dialing prompt system generates voice, text and/or image information, sends the information to the UE, and allows the user to continue dialing.

Some embodiments may also include, when the user starts dialing, for example, dialing the first digit, the dialing prompt system stops sending voice, text, and/or image information to the UE.

The dialing prompt system may use the pre-stored voice, text, and/or image information and the preset policy to generate the voice, text, and/or image information. The pre-stored voice, text and/or image information may be customized and obtained in many ways. The customized contents include but are not limited to: content to be sent, time of sending, and count of sending. The means of customization may include, but is not limited to, business hall, hotline, short message, web, network management system, and maintenance console.

The dialing prompt system consistent with the disclosed embodiments may work together with an external standalone service control entity, including but not limited to a Service Control Point (SCP), to implement dialing prompt and the relevant services. In the collaborative service implementation process, a voice, text, and/or image information generating entity, for example, dialing prompt information processing unit, may be either built-in or external.

In order to further clarify the present invention, the technical solution for implementing the service in this embodiment of the invention is detailed below.

In order to send voice, text, and/or image information to the user as dialing prompt information after the user sends a call request, the dialing prompt system in this embodiment of the invention is set in a communication system, and is adapted to generate voice, text and/or image information as prompt information. After receiving the call request of the user, the dialing prompt system sends the voice, text, and/or image information as dialing prompt information to the UE of the call originator, and the information continues until the call originator dials the first digit. Furthermore, while the call originator dials digits, namely, when the user has dialed some digits before all digits are finished, the communication can still use the system to send voice, text, and/or image information as dialing prompt information to the call originator according to the preset conditions, and the dialing prompt information continues until the call originator dials the next digit.

After the dialing prompt system provided in this embodiment of the invention is set in the communication system, if the user sends a call request to the communication system through a terminal, the monitoring unit detects the call request of the user through the first communication interface, and judges whether the user has customized dialing prompt information in the form of voice, text, and/or image information. If it is necessary to send such information to the user, the dialing prompt information processing unit sets up a bearer path to the UE, and the path connects the UE with the dialing prompt information processing unit. The communication system instructs the dialing prompt information processing unit to generate dialing prompt information, for example, voice, text and/or image information, for the UE according to the customized policy, and sends the dialing prompt information to the UE through the created bearer path. The UE presents the received information to the user.

After the voice, text, and/or image information is presented to the user, the monitoring unit monitors the user input (dialing). When detecting the first input (first digit dialed) of the user, the communication system instructs the dialing prompt information processing unit to stop sending information to the UE, or instructs the dialing prompt information processing unit to send new information as new dialing prompt information to the user.

If no input of the call originator is detected within the preset time, beyond the preset time, the call processing entity, for example, monitoring unit, instructs the voice, text, and/or image information generating entity, for example, dialing prompt information processing unit, to stop sending the information to the call originator terminal, or instructs the voice, text, and/or image information generating entity to send new information as new prompt information to the call originator. After detecting the user input, the monitoring unit keeps checking whether the user input matches the preset conditions, and generates the corresponding matching monitoring result if the matching result meets the preset requirements. The dialing prompt information processing unit generates new prompt information according to the monitoring result and sends the information to the user. Therefore, voice, text and/or image information is presented to the user within the intervals of dialing.

In some embodiments, in order to push the corresponding voice, text, and/or image information as a prompt tone to the calling party conveniently, the corresponding information needs to be customized at the system side first. In some embodiments, the voice, text, and/or image information may be customized as dialing prompt information freely in many ways.

The mode of customizing the voice, text, and/or image information in this embodiment of the invention is described below. In the process of implementing the embodiment of the present invention, the mode of customizing the voice, text, and/or image information is not limited to the modes as detailed hereinafter.

For example, a third party may be, but is not limited to, a business hall, a hotline, a short message, a web, a network management system, and a maintenance console, performs customization of the voice, text, and/or image information.

More particularly, such information may be customized through the second communication interface in FIG. 3 or FIG. 4. The second operation interface may shield the difference between different customization modes. That is, the second operation interface receives customization messages of different modes from the third party, retrieves necessary data from the message as customization contents, generates a unified internal command, and sends the information to the dialing prompt information processing unit to form a customization record and store the record. The customization record should include the preset policy and the customized call prompt information. In this way, the call prompt information for example, voice, text and/or image information, may be customized.

Further, the second communication interface provides an open application development and programming interface, through which the third-party developer may develop value-added services. The application development interface provided by the second communication interface may be a uniform standard interface which abstracts the lower-layer network. Through this interface, the third-party user may provide diversified services about the call prompt information in the form of voice, text, and/or image information by using the communication system consistent with this embodiment. The second communication interface provides the basic service capability features and the implementation method, including but not limited to, one or more items of service registration processing module, service instance lifecycle management module, service interaction interface module, integrity management interface module, and event notification interface module.

The application developed by the third-party user performs service registration to the communication system through the second communication interface, and generates a service instance within the system. After the instance is generated, the application developed by the third-party user operates the resources and methods inside the communication system by managing the instance, and accepts the management and scheduling within the communication system. Throughout the lifecycle of the service instance, the communication system notifies the corresponding event to the external application according to the registered information, and waits for receiving operations of the external application through a service interaction module.

In some embodiments, the dialing prompt information processing may be responsible for generating voice, text, and/or image information according to the monitoring result of the monitoring unit, the user attributes and the corresponding preset policy. The dialing prompt information processing unit may be physically set in a communication system, or set outside the communication system independently, and is connected with the communication system through multiple types of standard signaling and bearer interfaces. In some embodiments, the connection with the UE is performed as indicated by the dialing prompt information processing unit, and the call prompt information in the form of voice, text and/or image information is sent to the UE. The information sent in the connection may be in at least one of these forms, voice, text, and image.

The dialing prompt information processing unit may receive voice, text, and/or image information customized in multiple formats from the second communication interface, and store the information. In the service implementation, the dialing prompt information processing unit matches the information with the information format receivable by the UE, and sends the information to the UE.

The dialing prompt information processing unit may generate the corresponding voice, text, and/or image information according to the monitoring result. The monitoring result is description about user call information. The description includes the factor such as relation between information elements. The dialing prompt information processing unit maps the element in the description to the corresponding information expression mode, combines the information according to the element relation and other factors in the description, and generates voice, text, and/or image information required by the description.

The complete process of a user call is described below:

First, the monitoring unit detects a call origination request of the user. Through the off-hook action, the user originates a call request. The call origination request is transferred to the communication system through the user interface or trunk interface. The specific expression mode may be user signaling or trunk signaling. No matter whether the communication system detects the call origination request from the user or the trunk, the dialing prompt information processing unit checks the user attributes, queries and authenticates the service attributes of the user, decides the specific content of the prompt information according to the query and authentication results, creates a connection path between the user and the dialing prompt information processing unit, and sends the prompt information to the UE in use. Afterward, the monitoring unit further monitors the dialing information of the user.

Secondly, if the user provides no further call indication information within the preset time of waiting for prompt information, the dialing prompt information processing unit sends the next call prompt information, and disconnects the path between the user and the dialing prompt information processing unit upon arrival of the next preset time.

Finally, if the user provides further call indication information, for example, dials a digit, within the preset time of waiting for prompt information, the dialing prompt information processing unit performs the next step of call processing according to the call process. The dialing prompt information processing unit sends the new voice, text and/or image information to the UE in use.

The method provided in this embodiment of the invention is described hereinafter.

Embodiment 5

Figure 5:
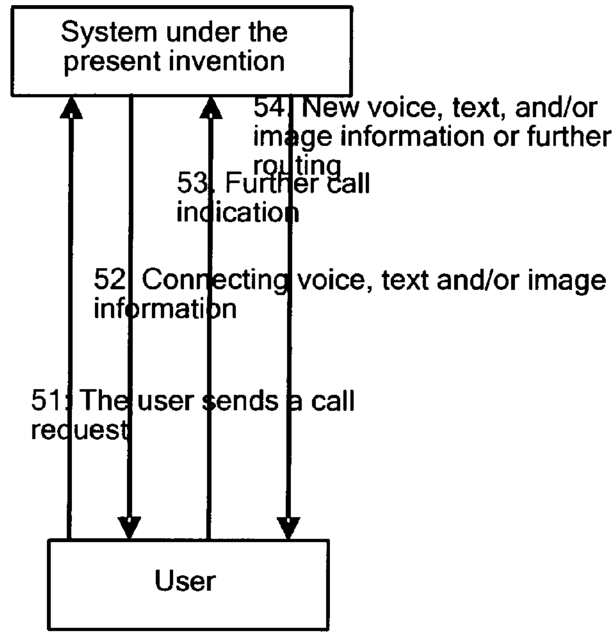
FIG. 5 is an exemplary flowchart of a dialing prompt method in the fifth embodiment of the present disclosure.

As shown in FIG. 5, the method in which a dialing prompt system is connected to the call originator directly to implement the dialing prompt service in this embodiment is detailed below:

Step 51: The user sends a call request.

Step 52: The dialing prompt system provided in this embodiment may send voice, text and/or image information according to the request.

Step 53: The user sends a further call indication.

Step 54: The dialing prompt system provided in this embodiment may send new voice, text, and/or image information, namely, at least one item of: voice information, text information, and image information, according to the further call indication; or performs further routing.

Embodiment 6

Figure 6:
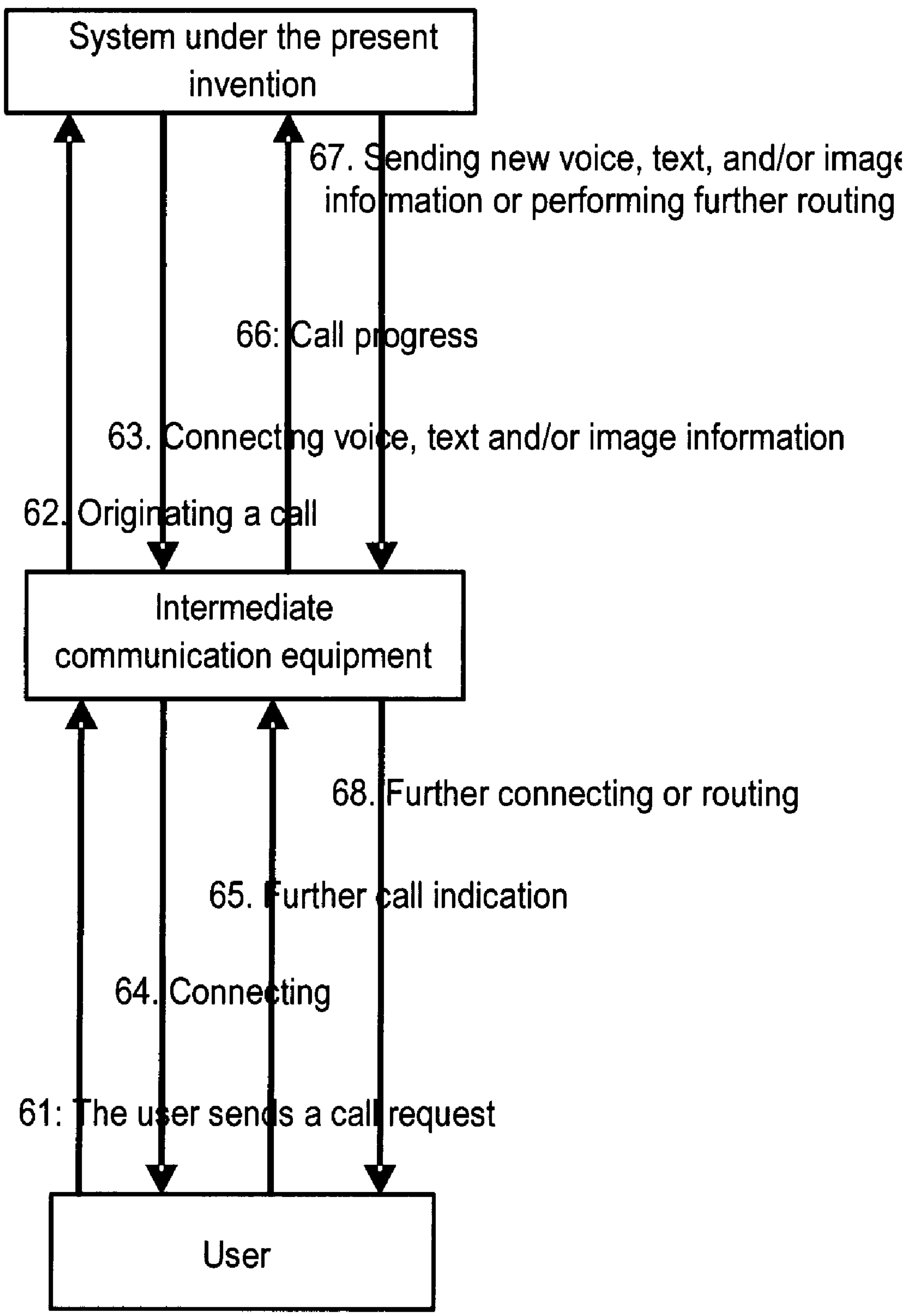
FIG. 6 is an exemplary flowchart of a dialing prompt method in the sixth embodiment of the present disclosure.

As shown in FIG. 6, the method in which a dialing prompt system is connected to the call originator through a trunk to implement the dialing prompt service in this embodiment of the invention is detailed below:

Step 61: The user sends a call request to the intermediate communication equipment.

Step 62: The intermediate communication equipment confirms that the originated call arrives at the dialing prompt system mentioned herein.

Step 63: The dialing prompt system provided in this embodiment may send voice, text, and/or image information to the intermediate communication equipment according to the request.

Step 64: The intermediate communication equipment is connected to the user and sends the voice, text, and/or image information to the user.

Step 65: The user sends a further call indication.

Step 66: The intermediate communication equipment confirms that the further call arrives at the dialing prompt system mentioned herein.

Step 67: The dialing prompt system provided in this embodiment may send new voice, text, and/or image information to the intermediate communication equipment according to the request, or performs further routing.

Step 68: The intermediate communication equipment continues connecting, or performs further routing.

Embodiment 7

Figure 7:
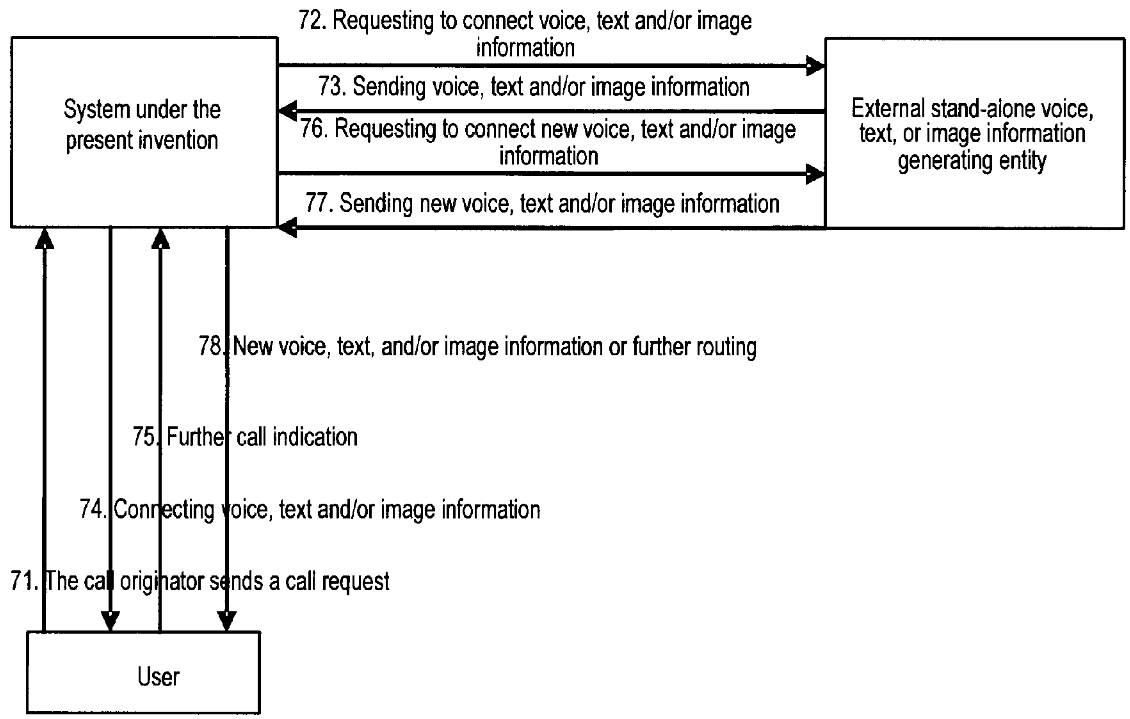
FIG. 7 is an exemplary flowchart of a dialing prompt method in the seventh embodiment of the present disclosure.

As shown in FIG. 7, the dialing prompt system provided in this embodiment may install the dialing prompt information processing unit, namely, voice, text, and/or image information generating entity, outside the system independently. The dialing prompt system provided in this embodiment may be connected with the user directly or through a trunk. For brevity of description, direct connection is supposed in FIG. 7. The method is detailed below:

Step 71: The user sends a call request.

Step 72: The dialing prompt system provided in this embodiment may request the dialing prompt information processing unit to send the corresponding voice, text and/or image information.

Step 73: The prompt information processing unit sends voice, text, and/or image information.

Step 74: The dialing prompt system provided in this embodiment may be connected to the user, and sends voice, text, and/or image information to the user.

Step 75: The user sends a further call indication.

Step 76: The dialing prompt system provided in this embodiment may request the dialing prompt information processing unit to send new voice, text, and/or image information.

Step 77: The dialing prompt information processing unit sends new voice, text, and/or image information.

Step 78: The dialing prompt system provided in this embodiment may be connected to the user, and sends new voice, text, and/or image information, or performs further routing.

Embodiment 8

Figure 8:
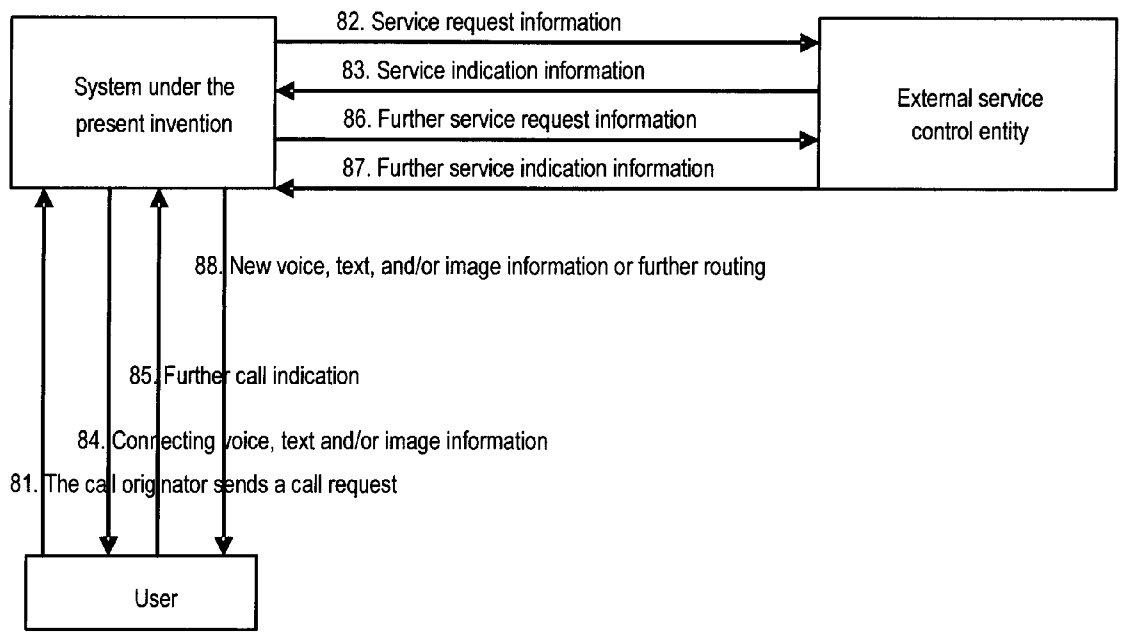
FIG. 8 is an exemplary flowchart of a dialing prompt method in the eighth embodiment of the present disclosure.

As shown in FIG. 8, the dialing prompt information processing unit of the dialing prompt system provided in this embodiment may work together with the service control entity to implement the service. The service control entity is generally external. In this solution, the dialing prompt system provided in this embodiment may be connected to the user directly or through a trunk; or a built-in dialing prompt information processing unit may be applied; or an external standalone dialing prompt information processing unit is applied. For brevity of description, direct connection and a built-in dialing prompt information processing unit are supposed in FIG. 8. The processing includes:

Step 81: The user originates a call request to the dialing prompt system provided in this embodiment.

Step 82: The dialing prompt system provided in this embodiment may send service request information to the service control entity.

Step 83: The service control entity sends service indication information to the dialing prompt system provided in this embodiment.

Step 84: The dialing prompt system provided in this embodiment may be connected to the user, and sends voice, text, and/or image information to the user.

Step 85: The user sends a further call indication.

Step 86: The dialing prompt system provided in this embodiment may send further service request information to the service control entity.

Step 87: The service control entity sends further service indication information to the dialing prompt system provided in this embodiment.

Step 88: The dialing prompt system provided in this embodiment may be connected to the user, and sends new voice, text, and/or image information, or performs further routing.

The foregoing solutions provided by the embodiments of the present invention reveal that after the embodiment of the present invention is applied to a communication system, a dialing prompt system generates voice, text, and/or image information, including at least one of these items: voice information, text information, picture information, and video image information, as dialing prompt information, and sends the information to the user, if the user sends a call request, by going off-hook, for example. That is, diversified information such as voice information, text information, picture information, and video image information may replace the existing unitary dialing prompt audio signal.

Therefore, through the embodiment of the present invention, the voice, text, and/or image information, including at least one item of: voice information, text information, picture, and video image information, may be sent to the call terminal before or during the dialing of the user. Therefore, the user obtains more information than monotonous audio signals.

Moreover, the embodiments of the present invention implemented in a communication system bring the following benefits:

(1) Proactive Release and Promotion of Information

For example, in order to promote discount services, the communication operator tends to use automatic call devices which make automatic calls to the user. After the user answers the call, the automatic call device plays the discount information. In this way, an extra automatic call device is required, and the user usually makes no answer. Through the present invention, however, the dialing prompt system may automatically announce the recent discount polices of the operator to the user who goes off-hook, thus avoiding the no-answer situation. That is, through the present invention, the operator pushes the specific information to the terminal proactively after the user goes off-hook, thus increasing the ratio of receiving the information.

(2) Customization and On-Demand Presentation of Information

For example, on the birthday of a user, another user may customize a birthday greeting as dialing prompt information for the former user. When going off-hook on the specified date, the former user hears or sees the birthday greeting. Besides, users may customize special prompt information for themselves, and a reminder announcement is presented to the user after the user goes off-hook at the specified time.

Although the invention has been described through some preferred embodiments, the invention is not limited to such embodiments. It is apparent that those skilled in the art can make various modifications and substitutions to the invention without departing from the spirit and scope of the invention. The invention is intended to cover the modifications and substitutions provided that they fall in the scope of protection defined by the claims or their equivalents.

The invention claimed is:

1. A dialing prompt system, comprising:

a monitoring unit, adapted to monitor whether it is necessary to send dialing prompt information to a user, and to send a triggering signal if necessary, said monitoring unit further comprising;

a call origination monitoring unit, adapted to monitor whether the user originates a call, wherein originating the call initiates a call process; and a call process monitoring unit, adapted to monitor whether call information in the call process of the user matches preset conditions, and to trigger a dialing prompt information processing unit if the call information matches the preset conditions; and the dialing prompt information processing unit, adapted to determine, according to the call information in the call process of the user, user attribute information, and a corresponding preset policy, the dialing prompt information to be sent to the user after receiving the triggering signal from the monitoring unit, wherein the dialing prompt information, includes voice information, text information, picture information, or video image information.

2. The system of claim 1, wherein the monitoring unit further comprises:

a call stop monitoring unit, adapted to monitor whether the call process of the user stops beyond a set time, and to send the triggering signal if the call process stops beyond the set time.

3. The system of claim 1, further comprising a prompt information storing unit, wherein the prompt information storing unit is adapted to store the dialing prompt information set by at least one of a communication system, a user or a third party; and the dialing prompt information processing unit is further adapted to read and to determine the dialing prompt information from the prompt information storing unit, according to the call information in the call process of the user, the user attribute information and the corresponding preset policy, as to when it is necessary to send the dialing prompt information to the user.

4. The system of claim 1, further comprising a prompt information setting unit, wherein the prompt information setting unit is adapted to set data information provided by at least one of a communication system, a user or a third party to the dialing prompt information as requested by the communication system, the user, or the third party.

5. The system of claim 1, further comprising a preset policy storing unit, wherein the preset policy storing unit is adapted to store the preset policy corresponding to the dialing prompt information according to user attributes and mode of communication system.

6. The system of claim 1, further comprising a preset policy setting unit, wherein the preset policy setting unit is adapted to set the preset policy corresponding to the dialing prompt information of the user, according to user attributes and a request by at least one of a communication system, a user, or a third party.

7. The system of claim 1, further comprising:

a first communication interface connected with a communication system, adapted to transmit information between the communication system and the dialing prompt system; and the monitoring unit, adapted to monitor whether it is necessary to send the dialing prompt information to the user through the first communication interface.

8. The system of claim 1, further comprising a second communication interface and at least one of a communication system, a user, or a third-party setting the dialing prompt information or the preset policy through the second communication interface.

9. A method of dialing prompt, comprising:

monitoring whether a user originates a call, wherein originating the call initiates a call process;

monitoring whether call information in the call process of the user matches preset conditions, and sending dialing prompt information to the user if the call information matches the preset conditions; and determining the dialing prompt information, according to the call information in the call process of the user, user attribute information, and a corresponding preset policy, to be sent to the user, wherein the dialing prompt information includes voice information, text information, picture information, or video image information.

10. The method of claim 9, further comprising:

monitoring whether the call process stops beyond a set time, and sending the dialing prompt information to the user if the call process stops beyond the set time.

11. The method of claim 9, further comprising:

setting data information provided by at least one of a communication system, a user, or a third party to the dialing prompt information as requested by the communication system, the user, or the third party, and storing the dialing prompt information.

12. The method of claim 9, further comprising:

setting the preset policy corresponding to the dialing prompt information of the user according to user attributes and a request by at least one of a communication system, a user, or a third party, and storing the preset policy.

* * * * *